United States Patent [19]

Youngquist

[11] 3,998,800
[45] Dec. 21, 1976

[54] DEFLAVORING OLEAGINOUS SEED PROTEIN MATERIALS

[75] Inventor: Rudolph William Youngquist, Cincinnati, Ohio

[73] Assignee: The Procter & Gamble Company, Cincinnati, Ohio

[22] Filed: Dec. 10, 1974

[21] Appl. No.: 531,262

Related U.S. Application Data

[63] Continuation-in-part of Ser. No. 428,478, Dec. 26, 1973, abandoned, which is a continuation-in-part of Ser. No. 302,172, Oct. 30, 1972, abandoned.

[52] U.S. Cl. .......................................... 260/123.5
[51] Int. Cl.$^2$ .......................................... A23J 1/14
[58] Field of Search ................................ 260/123.5

[56] References Cited

UNITED STATES PATENTS

| | | | |
|---|---|---|---|
| 2,278,670 | 4/1942 | Rauer | 260/123.5 |
| 2,384,388 | 9/1945 | Monte et al. | 260/123.5 UX |
| 2,495,706 | 1/1950 | De Voss et al. | 260/123.5 X |
| 2,615,905 | 10/1952 | Forstmann et al. | 260/123.5 X |
| 3,459,555 | 8/1969 | King | 260/123.5 X |
| 3,714,210 | 1/1973 | Schweiger et al. | 260/123.5 UX |
| 3,734,901 | 5/1973 | Hayes et al. | 260/123.5 |

FOREIGN PATENTS OR APPLICATIONS 2,355,892   5/1974   Germany

Primary Examiner—Howard E. Schain
Attorney, Agent, or Firm—Rose Ann Dabek; Jerry J. Yetter; Richard C. Witte

[57] ABSTRACT

A process for deflavoring oleaginous seed protein material comprising contacting said material with a single phase, three component, solvent system comprising a mixture of a non-polar hydrocarbon, a slightly polar, oxygen-containing organic solvent and water.

9 Claims, 1 Drawing Figure

HEXANE / ETHANOL / WATER
PHASE DIAGRAM

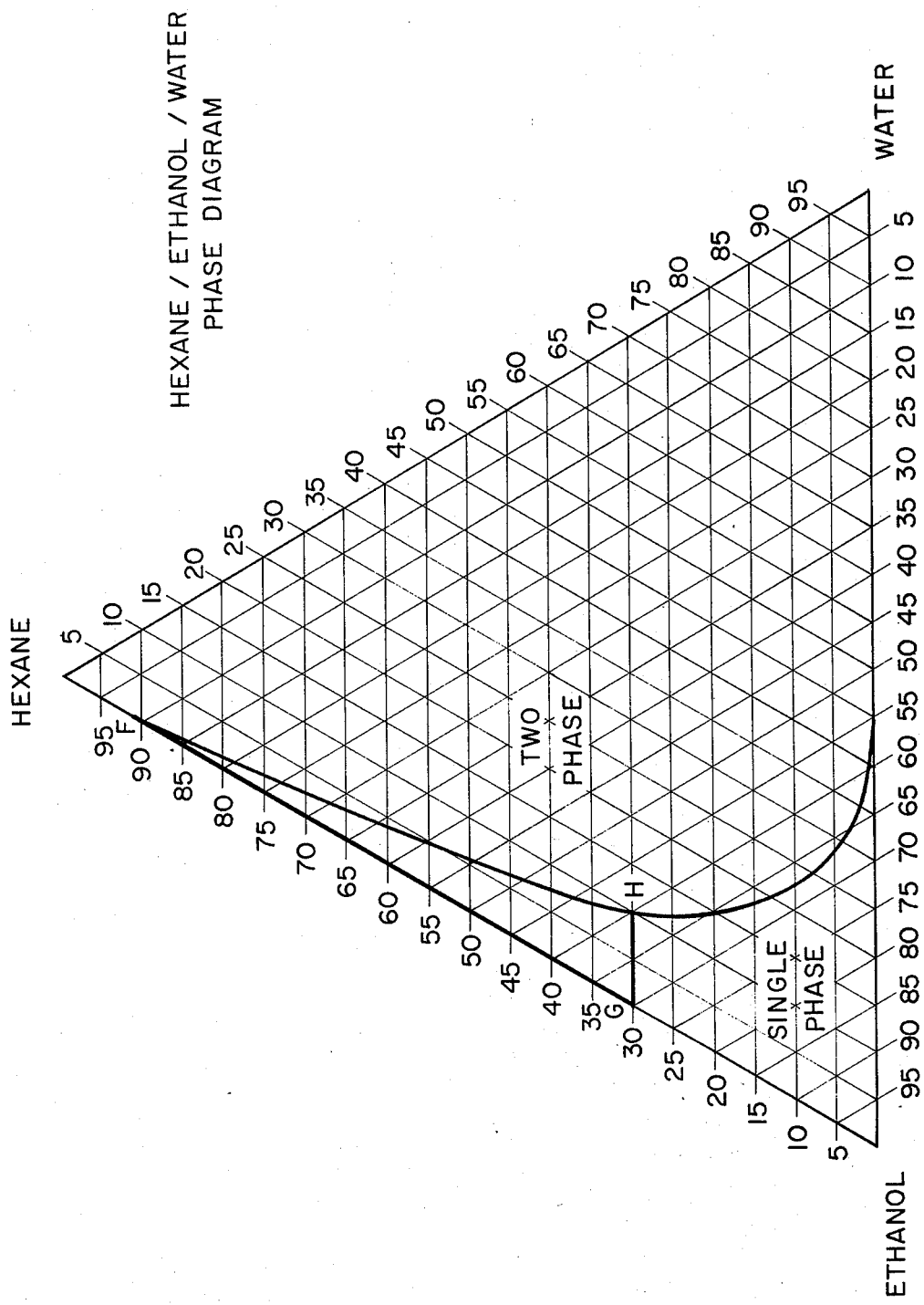

DEFLAVORING OLEAGINOUS SEED PROTEIN MATERIALS

RELATED APPLICATIONS

This application is a continuation-in-part of patent application Ser. No. 428,478 filed Dec. 26, 1973, now abandoned which is a continuation-in-part of patent application Ser. No. 302,172, filed Oct. 30, 1972, now abandoned.

BACKGROUND OF THE INVENTION

1. Field of the Invention

This invention relates to deflavoring and concentrating the proteinaceous component of oleaginous seed materials by solvent extraction.

2. The Prior Art

By deflavoring is meant the removal of objectionable flavor notes which are characteristic of certain oleaginous seeds, especially the soybean, such that the product after deflavoring may be considered organoleptically bland. Oleaginous seeds encompass such seeds as cottonseed, soybean, rape seed, peanuts and copra. For example, with respect to soybeans, the known oleaginous seed protein materials which are typically encountered in industry and are benefited by the instant process invention are defatted flakes and meal. However, with this important qualification: Certain oleaginous seed protein materials have been so extensively denatured and macroscopically altered by severe heat treatments that solvent extraction means are virtually without effect. For example, certain commercially prepared soybean meal fractions have been so severely damaged during toasting that a seared or cauterized surface on the meal particles prevents solvent transfer to the interior. In such cases, re-comminution of the process fraction is necessary to expose less damaged surface to the solvent.

The term "concentrating" refers to the selective removal of non-proteinaceous components of such oleaginous seeds such that the protein level of the resulting product is increased. A variety of methods are known for obtaining such products.

Examples of such products are soy concentrates and soy isolates. Soybean concentrate is a term applied to soybean protein materials which have been substantially defatted and leached of a varying amount of carbohydrate to enhance the protein content. The term soybean isolate is used to denote soy protein which typically has been obtained by extraction of concentrate or defatted meal with acidic or alkaline aqueous solutions and precipitation of the solubilized protein at its isoelectric point.

The solvent extraction apparatus and manipulative steps employed in this invention encompass any of the conventional equipment and techniques of commercial solvent extraction, batch-wise or continuous.

A great deal of prior art has been developed relative to process means for deflavoring oleaginous seeds — particularly the soybean because of its unpalatable flavor which has colorfully, but accurately, been described as bitter, green beany, throat-catching, paint-like, solvent-like, cardboardy, and like terms singularly applied or as a collective nuance. But, to date, no commercially advantageous scheme has been devised to remove these objectional flavors from the protein component. This fact is succintly conveyed, on occasions of critical evaluation of these prior art schemes, by the old saw: 'It still tastes like soybeans'.

A shortcoming of prior art deflavoring process schemes, and, some process schemes designed to enhance relative protein concentration, is that by consequence of the process (e.g., steam extractions, hot alcoholic extractions, and harsh caustic treatments) the resulting protein is substantially denatured; thus, substantially destroying the utility of the protein for subsequent use in products which require the native functionality of the protein to be preserved intact. Such properties destroyed or substantially diminished by denaturization include water solubility, foamability, colloid formation (aqueous dispersions and gels), and heat setting properties. Thus, generally the prior art processes fail to achieve a bland tasting protein material; and in processes which can provide significant deflavoring substantial denaturization occurs.

Representative prior art schemes are detailed in the following publications: 48 *Cereal Chemist* 640 (1971), Eldridge, et al.; U.S. Pat. Nos. 3,023,107, Feb. 27, 1962, to G. C. Mustakas; 2,635,094, Apr. 14, 1953, to P. H. Belter, et al.; 2,495,706, Jan. 31, 1950, to L. I. DeVoss; 3,365,440, Jan. 23, 1968, to S. J. Circle, et al.; 2,278,670, Apr. 7, 1942, to P. Rauer; 3,043,826, July 10, 1962, N. J. Beaber, et al.; 3,734,901 to Hayes, et al., May 22, 1973; Belgium Pat. No. 772,811, granted Sept. 20, 1971.

Accordingly, it is an object of the present invention to deflavor oleaginous seed protein material by solvent extraction to yield an organoleptically bland product.

A second object of this invention is to deflavor oleaginous seed protein material without substantial detriment to the functionality of the native protein. That is, a combined object of the present invention is to optimize deflavoring and minimize the denaturization which frequently accompanies prior art procedures.

SUMMARY OF THE INVENTION

This invention provides a process for deflavoring the proteinaceous components of oleaginous seed materials which comprises the steps of:

a. contacting an oleaginous seed protein material having from about 0 to about 16% moisture content by weight with a three-component single phase solvent which comprises a mixture of from about 30% to about 90% of a non-polar, linear, branched or cyclic saturated hydrocarbon having from 5 to about 12 carbon atoms, from about 10% to about 69.9% of an alcohol having from about 1 to about 12 carbon atoms, and from about 0.1% to about 10% water at a temperature of from about 30° C to the boiling point of the system; and b. desolventizing to obtain a product of enhanced blandness.

BRIEF DESCRIPTION OF THE DRAWING

The drawing presents the phase diagram for hexane-ethanol-water, the preferred three component solvent mixture of this invention at 50° C. The drawing is discussed in more detail hereinafter.

DETAILED DESCRIPTION OF THE INVENTION AND ITS PREFERRED EMBODIMENTS

Unexpectedly, it has been discovered that oleaginous seed protein materials can be rendered organoleptically bland by a solvent extraction procedure which recognizes the critical importance of employing a single phase ternary solvent comprising a non-polar saturated hydrocarbon, alcohol and water. The maintenance of this dynamic balance with certain critical solvent systems not only rids the oleaginous seed protein material of its seemingly intractable and distinctive flavors, but does so without extensive, irreversible denaturization of the protein components.

It is critical that the solvent system exists as a single phase. Typically, the concentration of the water component will range from as little as 0.1% to as much as 10.0%, the actual upper value not exceeding the maximum concentration of water permissible without causing a phase separation to occur in the chosen three component solvent mixture. If a phase separation does occur, a resulting phase high in water content greatly increases the likelihood of protein denaturization at preferred elevated extraction temperatures. Consequently, it is preferred that the moisture content of the oleaginous protein seed material to be extracted range from about 1.0 to about 16 wt. %, i.e., below or within the normal moisture content range, rather than risk a sudden phase separation which might occur on treating oleaginous seed protein which had been raised to an unnaturally high moisture content, i.e., sensible dampness.

Representative examples of suitable non-polar linear, branched and cyclic saturated hydrocarbons are those having from 5 to about 12 carbon atoms which possess a normal boiling point below about 200° C. Examples of such hydrocarbons are hexane, cyclohexane, 1,3-dimethylcyclohexane, cyclopentane, cyclooctane, 3-ethylpentane, octane, nonane, and decane. Hexane is highly preferred because it is inert, easily removed and toxicologically safe. These desirable properties are in contrast to the properties of polar hydrocarbons such as benzene which are not employed in this invention.

Representative examples of suitable alcohols are primary, secondary, and tertiary aliphatic alcohols, such as methanol, ethanol, propanol, isopropanol, 1-, 2-, and 3-hexanol and butanol. Methanol, ethanol, isopropanol and mixtures thereof are preferred. Ethanol is most preferred.

In actual practice, the make-up of a particular solvent system suitable for purposes of this invention is first governed by the miscibility of the non-polar and slightly polar component. The non-polar component can be usefully emloyed in concentration range of from 30% to about 65%. The alcohol can desirably comprise from about 30% to about 69%, by weight, of the solvent system. The third critical component, water, preferably comprises from 1% to 10% of the balance. The maximum concentration of water which can be tolerated is easily determined by the onset of a phase separation. In practice, it has been found that optimum results are achieved when the water concentration is near its maximum solubility. While each of the three components must be present in the solvent system within the range of these concentrations, the actual relative concentrations which can be employed must be such that the three component solvent system exists as a single phase. The actual permissible concentrations are readily apparent on construction and examination of phase diagrams. For example, the Drawing is a phase diagram of hexane-ethanol-water at 50° C. A suitable solvent system comprising these components present in the required concentration range, specified hereinbefore, are coordinated amounts falling within an area bounded by the line FGH in the accompanying drawing.

Representative examples of such preferred solvent systems of this invention are: hexane:ethanol:water; heptane:ethanol: water; hexane:methanol:water; cyclohexane:isopropanol:water; cyclohexane:ethanol:water; and hexane:ethanol/methanol:water.

An excellent example of a solvent system composed of the preferred hexane, ethanol, and water comprises in the weight percent relationship: hexane from about 30 to about 65 (preferably 35 to 50), ethanol from about 30 to about 69.9, (preferably 45 to 69), and water from about 3 to about 10, the relative coordinated amount being such to maintain a single phase. Solvent systems of the invention wherein the ratio of hexane to ethanol is from about 2:1 to 1:2 with water concentration near maximum solubility are preferred in that these systems provide rapid deflavoring without substantial denaturization.

As indicated above, the instant process invention finds utility in deflavoring oleaginous seed protein from cotton-seed, peanuts, copra, rape seed, and soybeans. Besides the deflavoring effect, the instant invention is also effective in the extraction of certain antinutritional factors, e.g., especially the gossypol fraction of cotton-seed. For economic reasons, soybean is the oleaginous seed of primary importance. Even though no theoretical explanation can account for the unexpectedly superior results obtained by practice of the present invention characterizing information points to the criticality of the water component in the instant solvent system.

To illustrate the importance of water, a set of solvent extractions were performed on defatted soy flakes. Two solvent systems were employed. In one series of extractions, a hexane-ethanol solvent was made up according to the weight relationship: 79 hexane:21 ethanol. In the other set of extractions, a hexane-ethanol-water solvent system was made up according to the weight relationship: 78.5 hexane:20.8 ethanol:0.7 water. The object of the study was to monitor the water content of the flakes as extractions proceeded under the conditions of either solvent system. Operationally, these extractions were conducted in batch-wise procedure upon 300 grams of soy flakes in each case. The weight of solvent for each extraction step was 2 kg to provide a solvent to flake ratio of 20:3. Each extraction step was carried out for 20 minutes at 50° C; whereupon fresh solvent was added for the next extraction. Table I summarizes the data obtained from this study. It is apparent that the instantly preferred solvent (solvent system II) struck a dynamic balance with the moisture content of the flakes and the water content of the solvent system since the moisture content of the flakes remains essentially constant throughout the extraction series. On the other hand, the flakes extracted with the two component solvent system (I) showed a continual decrease in moisture content as extraction proceeded.

Another important observation relative to the data represented in Table I is that the efficiency of the deflavoring process paralleled the decreasing moisture content in the two component solvent system (I); whereas the extractions conducted in the three component solvent system (II) of the invention proceeded with undiminished deflavoring efficiency throughout the extraction steps. This deflavoring data was obtained by thoroughly desolventizing a sample quantity of the flakes after any given extraction stage and tasting an aqueous slurry of the sample.

TABLE I

MOISTURE CONTENT OF SOY FLAKES DURING PROGRESSIVE STAGES OF EXTRACTION USING HEXANE:ETHANOL AS SOLVENT SYSTEM I AND HEXANE:ETHANOL:WATER AS SOLVENT SYSTEM II

| | Wt. % Water in Soy Flakes at Extraction Stage* | | | | | | |
|---|---|---|---|---|---|---|---|
| | 1 | 2 | 3 | 4 | 5 | 6 | 7 |
| Hexane:Ethanol Solvent System I | 5.6 | 4.1 | 3.0 | 3.6 | 2.8 | 2.4 | 2.1 |
| Hexane:Ethanol:Water Solvent System II | 9.8 | 9.3 | 9.1 | 8.8 | 9.0 | 8.9 | 8.9 |

*Determined by Karl Fischer titration

The critical importance of water can be further illustrated by examining deflavoring efficiency upon soy meal which had been reduced in moisture content to a value well below that commonly encountered. For this purpose defatted soybean meal was spread in a desiccator loaded with phosphorous pentoxide at 25° C for 7 days, whereupon the moisture level was reduced to 3.7 wt. %. The meal was then subjected to batch-wise extraction in beakers with stirring using a solvent to meal ratio of 20:3 and 20 minutes per extraction. The solvent system was the above described hexane:ethanol:water. After ten extractions, the strong characteristic beany flavor of the soybean meal had vanished and the moisture content of the meal had risen to a value comparable to that of the soy flakes represented in Table I (solvent system II). However, when the dehydrated meal was similarly extracted with a 79 wt. % hexane-21 wt. % ethanol solvent, the objectionable flavor was undiminished after 10 extractions. Thus, water is critical to the deflavoring process, and the instant solvent systems provide a dynamically balanced water reservoir, which, under the constraints of the instant process invention, not only permit deflavoring but substantially diminish protein denaturization occasioned by the presence of excessive (non-dynamically balanced) water.

The temperature at which the extraction is conducted is also important. Good results can be obtained at 30° C but the number of extractions is reduced if heat is applied to the extraction process. It has been found that using the above described hexane:ethanol:water system, an extraction temperature ranging from about 40° to about 56° C, preferably 45° to 56° C, is best for obtaining both efficiency and quality in the deflavoring process. The upper temperature is governed by the boiling point; using high pressure extraction apparatus the upper temperature can be extended. As noted above, an unexpected advantage of the instant process invention is that even at these elevated temperatures, denaturization of the soy protein does not occur to a significant extent. As is well known in the art, extraction procedures involving aqueousalcohol and heating generally produce extensive denaturization. So, it was surprising that the instant solvent system permits the above-indicated extent of deflavoring without concomitant denaturization of the protein.

The solvent to oleaginous seed material ratio is not overly critical and may range from about 2:1 to about 10:1. The extremes of this range are governed by factors of convenience, efficiency and overall design of the extraction process such that the preferred solvent to material ratio is typically from about 3:1 to about 8:1.

The extraction may be practiced using either continuous or discontinuous flow apparatus. For example, the passing of two streams in countercurrent relation may be achieved through the use of a wide variety of treating equipment (mass transfer contactors). This includes vertical towers, basket extractors of various types, batch vessels interconnected for countercurrent operation, and the like. Representative examples of such equipment are found in the following U.S. Patents, which are incorporated herein by reference: U.S. Pat No. 2,559,257, granted July 3, 1951, to J. H. Obey; and U.S. Pat. No. 2,074,988, granted Mar. 23, 1937, to W. J. O'Brien.

The following examples further illustrate the invention.

EXAMPLE I

120 Pounds of full-fat soy flakes were defatted according to the following procedure. The flakes were placed in a basket equipped with wire screening and a total of 55 gallons of hexane at 30° C was pumped from a heated reservoir to the basket and allowed to percolate with occasional agitation through the soy flake bed to provide a contact time of 30 minutes. This process was twice again repeated with fresh solvent batches. A 25 pound portion of the resulting hexane-wet flakes were retained in the extraction basket for subsequent deflavoring to the instant invention.

A single phase three component deflavoring solvent was made up from hexane, ethanol and water according to the weight relationship 78.5:20.8:0.7, respectively. About 200 pounds of this solvent were maintained in a heated reservoir at 55° C. 150 Pounds shots of this solvent were then pumped to the basket containing 25 pounds of the hexane-wet flakes and allowed to percolate to provide a contact time of 20 minutes at a 6:1 solvent to flake ratio. Representative samples were taken after each batch extraction stage for later analysis. By this technique it was determined that the objectionable flavor in the soy flakes vanished after four batch extractions.

The composition of the solvent was maintained constant throughout the extraction procedure by sampling occasionally to determine if additional water should be added. It should be noted that the hexane:ethanol:water system as above-described is amenable to continuous solvent extraction because the solvent can be recycled with maintenance of constant composition with relatively simple distillation equipment. The particular hexane:ethanol mixture of the three component single phase system employed in this example is an azeotrope boiling at 58.7° C. However, the total hexane:ethanol:water system exhibits an azeotrope at 56.0° C in the gas phase which splits into two phases (an upper phase, 96.5:3.0:0.5, and a lower phase, 75:6:19, hexane:ethanol:water weight ratio, respectively) upon condensing. These phases may be collected and adjusted in composition to the preferred component ranges. Therefore, when using a single still for recycling, fairly close temperature control must be maintained.

The resulting product from Example I was air dried at 125° for 18 hours, and, apart from a slight cereal flavor, was totally bland and devoid of the characteristic soybean flavors.

Substantially equivalent results are obtained as in Example I when the hexane oil extraction step is omitted.

As in Example I, substantial deflavoring results are obtained when the hexane-wet soy flakes are replaced by soy concentrate, and soy isolate, respectively. Also enhanced blandness is obtained according to the procedure of Example I when the hexane-wet soy flakes are replaced by soy meal, and soy flour, respectively.

As in Example I, substantial deflavoring results are obtained when the solvent system is replaced by a single phase solvent system having the following composition (weight ratio): 50 hexane:45 ethanol:5 water; 70 hexane: 37 ethanol:3 water; 30 hexane:65 ethanol:5 water is preferred.

As in Example I, substantial deflavoring results are obtained when the hexane-ethanol-water solvent system is replaced by the following single phase three component solvent system: 71.0 cyclohexane:21.5 isopropanol: 7.5 water (weight ratio).

As in Example I, organoleptically bland products are obtained when the soy flakes of Example I are replaced by peanut, rapeseed, copra, and cottonseed, respectively.

As in Example I, organoleptically bland protein concentrates are obtained when the deflavoring process of Example I is followed by an alcoholic, and pH 4.5 water extraction, respectively.

EXAMPLE II

Part A

To a five liter three-neck flask there was added 1800 g of a single phase three component deflavoring solvent made up from hexane, ethanol and water according to the weight relationship 60:38:2, respectively, and 300 g of defatted soy flakes having a moisture content of about 10%. This mixture was mechanically stirred and heated at reflux (56° C) for 15 minutes.

This mixture was then vacuum-filtered to remove substantially all of the solvent from the flakes. The flakes were then spread upon a tray and allowed to air dry at room temperature. The tray of flakes was then placed in an oven at 125° F for 18 hours to completely remove any remaining solvent.

Except for a slight cereal taste, the flakes had a very bland taste.

Part B

When in Part A, the deflavoring solvent is made up from hexane, ethanol and water according to the weight relationship 78.5:20.8:0.7, a reflux period of about 6 hours is necessary in order to obtain flakes with a bland taste. The solvent system employed in Part A is, therefore, highly preferred.

While the solvent system employed in Part A provides excellent and rapid deflavoring, it has been found that from a processing standpoint that such a single phase system employing from 3 to 10% water can be desirable in that the single phase system is more easily maintained.

EXAMPLE III

This example illustrates the importance a single phase three component solvent system in avoiding protein denaturization while deflavoring.

Part A

Two hundred grams of defatted soy bean flakes were slurried with 1000 grams of a solvent extraction medium maintained at 120° F (49° C) for 20 minutes. The solvent was removed from the flakes by filtration. The flakes were treated two more times employing this procedure each time with fresh solvent extraction medium. The flakes were then dried for 4 hours at 135° F to remove trace solvent.

Employing this procedure, a comparison of two solvent extraction mediums was made. In one test, the equilibrated solvent extraction medium employed was a single phase composition designated Solvent System I comprising 60% hexane, 38% ethanol and 2% water. In another test, the equilibrated solvent extraction medium employed was a two phase composition designated Solvent System II comprising 64% hexane, 26% ethanol, and 10% water.

The characteristics of the deflavored soybean flakes obtained was then assessed.

Nitrogen solubility

One gram of deflavored flakes was slurried with 20 ml. water at room temperature and stirred for 30 minutes. The mixture was centrifuged and the supernatant liquid collected. The amount of nitrogen in the supernatant liquid was determined. Greater amounts of nitrogen indicate greater protein solubility and less protein denaturation, lesser amounts of nitrogen indicate less protein solubility and increased protein denaturation. The nitrogen solubilities of the deflavored flakes were as follows:

Flakes extracted with Solvent System I 0.9 mg/ml
Flakes extracted with Solvent System II 0.2 mg/ml

Part B (Concentrate Foamability)

Soy concentrates were prepared from portions of each of the deflavored flakes obtained in Part A as follows:

One part deflavored flakes were slurried with 10 parts 70% aqueous ethanol at room temperature (27° C) for 15 minutes. The aqueous ethanol as removed by filtration and the procedure was repeated 4 times employing fresh 70% aqueous ethanol. The flakes were then slurried with 10 parts 100% ethanol, and the ethanol was removed by filtration. The resulting product, a soy protein concentrate, was air dried.

The foamability of each of the concentrates obtained from the deflavored flakes was determined by adding 1 gram of concentrate to a graduated beaker containing 20 ml of water at room temperature and stirring the mixture at moderate speed for thirty minutes. Stirring was ceased; after standing for 5 minutes, the foam volumes were measured. The results were as follows:

Concentrate prepared from flakes extracted with Solvent System I — 22 mls foam
Concentrate prepared from flakes extracted with Solvent System II — 8 mls foam Greater foamability indicated less protein denaturation.

Part C (Isolate preparation)

Two 200 grams portion of soybean flakes were deflavored as in Part A above. One portion was deflavored with Solvent System I, the other portion was deflavored with Solvent System II.

The dry deflavored flakes were converted to soy isolates as follows:

The deflavored flakes were mixed with 10 times their weight of water having sufficient sodium hydroxide to provide a pH of 9.5 for 1 hour. This mixture was then centrifuged to separate the solids from the liquid. The pH of the liquid was then lowered to 4.5 by the addition of HCl to precipitate a soy isolate. The isolate was separated by centrifuging, slurried with 300 ml. water, centrifuged to remove the water and freeze dried. The following quantities of soy isolate were obtained from the deflavored soy flakes extracted with Solvent System I and II, respectively.

Amount of isolate obtained from flakes extracted with Solvent System I — 49.6 g Amount of isolate obtained from flakes extracted with Solvent System II — 11.7 g The greater amount of soy isolate obtained from the flakes extracted from Solvent System I indicates these flakes contained less denatured protein than the flakes extracted with Solvent System II.

The soy concentrates and isolates obtained had a bland taste.

Preferably oleaginous seed protein materials are deflavored prior to concentrating.

In a preferred aspect, the present invention embodies a two-step process which comprises as a first-step deflavoring oleaginous seed protein materials, such as, flakes and meals, with the three-component, single phase solvent system of the invention; and as a second step, an appropriate concentrating treatment which selectively extracts non-proteinaceous components in a manner which does not substantially denature the highly functional protein provided by the deflavoring process of this invention.

For example, a follow-up extraction of the deflavored soy flakes with the following water-alcohol system can provide a preferred highly functional soy protein concentrate. This second solvent extraction concentrates the protein by immobilizing the protein and dissolving and carrying away non-proteinaceous components, principally the carbohydrates.

The alcohols suitable for practice of this second step may be selected from the group consisting of ethanol, methanol, butanol, propanol and isopropanol. The most preferred alcohol is ethanol. And the preferred water-alcohol solvent mixture is from about 60 to about 90 wt. % ethanol.

In this second step the following conditions of extraction are recommended for best results:

As mentioned above, the second concentrating and deflavoring step can be conducted in a range encompassing room temperature, i.e., from about 20° to about 40° C. However, the range from about 20° to about 30° C is preferred.

The 'pH' of the alcoholic solutions have been found to have little effect on the concentrating and deflavoring efficiency of the instant process but the preferred 'pH' corresponds to neutral conditions.

Solvent to oleaginous seed protein material ratio and other variables such as time and number of stages in the extraction process are variables that are largely controlled by the type of extraction apparatus employed and by the degree of deflavoring and concentrating desired. This overall process may be conducted, as noted earlier, in batch or as a continuous extraction process. For example, with respect to soy flakes and meal, when the solvent to flake meal ratio is within the range of from about 2:1 to about 10:1 from 2 to 7 batch-wise extractions conducted with a percolation period of 30 minutes are satisfactory in the second process step to raise the protein concentration from an initial value of from about 50 to about 58 wt. % to about 65 to about 75 wt. %.

Final desolventizing is not critical and can be achieved by conventional means such as free draining, mild contrifuging followed by forced air drying. The instantly preferred method is forced air drying of drained flakes at a temperature of from about 40° to about 60° C.

The prior examples illustrate the union of the two above-described process steps going to form an overall process means for deflavoring and concentrating oleaginous seed protein materials to provide highly functional protein concentrates and isolates.

All parts and percentages herein are expressed on a weight basis unless otherwise specified.

What is claimed is:

1. A process for deflavoring defatted soybean protein material which comprises the steps of:
    a. contacting defatted soybean protein material having from about 0 to about 16% moisture content by weight with a three-component, single phase solvent which comprises a mixture of from about 30 to about 90 wt.% of a non-polar linear, branched or cyclic saturated hydrocarbon having from 5 to about 12 carbon atoms and an atmospheric boiling temperature below about 200° C, from about 10 to about 69.9 wt.% of an alcohol having from 1 to about 12 carbon atoms, and from about 0.1 to about 10 wt.% water at a temperature of from about 30° C to the boiling temperature of the solvent system; and
    b. desolventizing to obtain a proteinaceous soybean product of enhanced blandness.

2. The process of claim 1 wherein the three-component, single phase solvent comprises a mixture of from about 30 to about 65 wt % of a non-polar hydrocarbon having from 5 to about 10 carbon atoms and an atmospheric boiling temperature below about 200° C, from about 30 to about 69 wt. % of an alcohol having from 1 to about 6 carbon atoms, and from about 1 to about 10 wt. % water.

3. The process of claim 2 wherein the hydrocarbon is selected from the group consisting of hexane, heptane and cyclohexane, and the alcohol is selected from the group consisting of methanol, ethanol, propanol and isopropanol.

4. The process of claim 3 wherein the three component single phase solvent contains from 30 to 65 wt. % hydrocarbon, from 30 to 65 wt. % alcohol, and from 1 to 10 wt. % water.

5. The process of claim 4 wherein the hydrocarbon is hexane and the alcohol is ethanol.

6. The process of claim 5 wherein the three component single phase solvent contains from 3 to 10 wt. % water.

7. The process of claim 6 wherein the temperature of the solvent system is from about 40° to 56° C.

8. The process of claim 1 wherein the soybean protein material consists of defatted soybean flakes and defatted soybean meal which are subsequently concentrated by contacting said flakes or meal with a water-alcohol solvent mixture containing from about 60 to 90 wt.% alcohol at a temperature of from 20° to 40° C, and extracting non-proteinaceous components to obtain deflavored soy protein concentrate.

9. The process of claim 8 wherein the alcohol is ethanol.

* * * * *